UNITED STATES PATENT OFFICE.

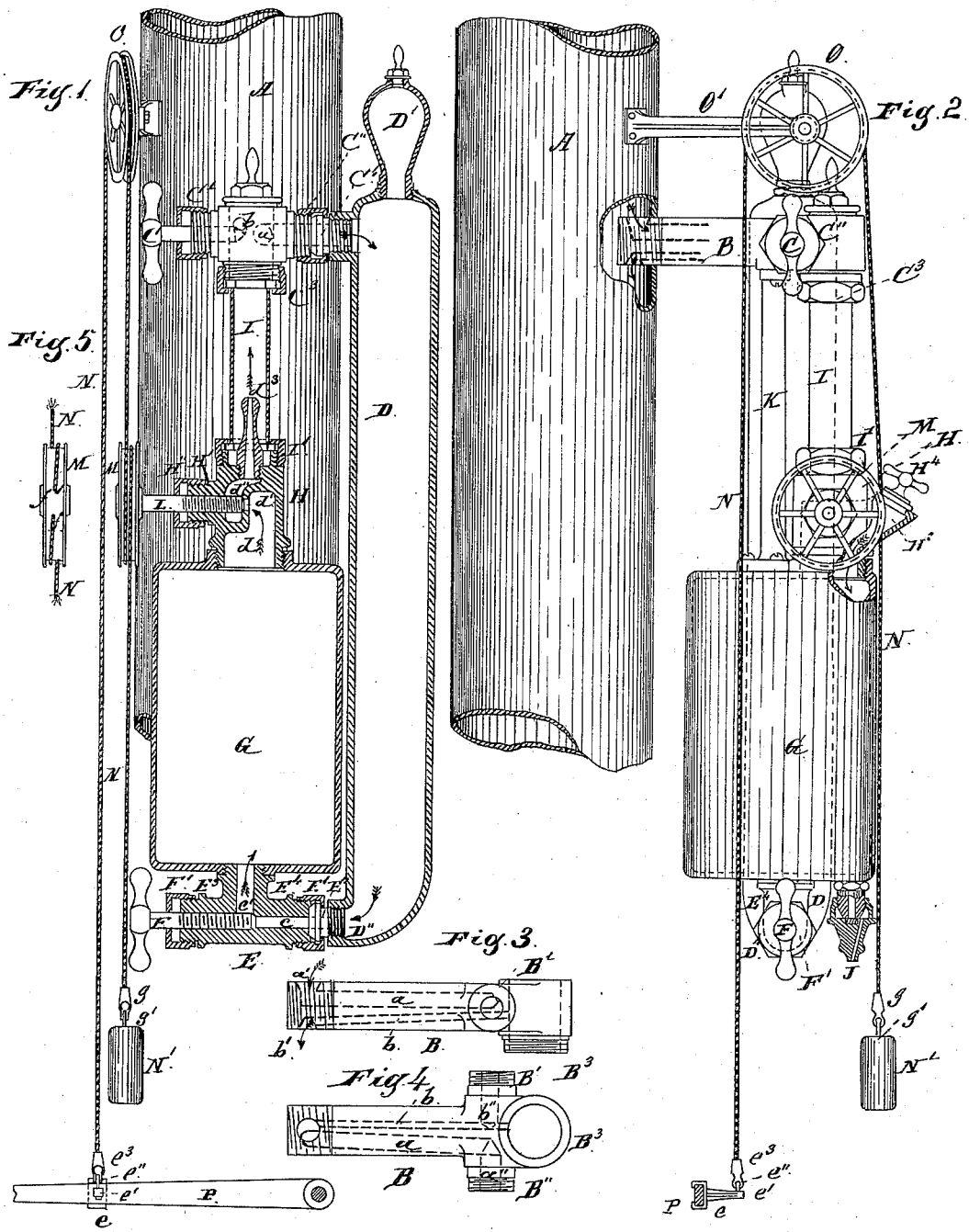

GEORGE McNEIL, OF CHICAGO, ILLINOIS.

AUTOMATIC LUBRICATOR.

SPECIFICATION forming part of Letters Patent No. 313,095, dated March 3, 1885.

Application filed August 19, 1884. (No model.)

*To all whom it may concern:*

Be it known that I, GEORGE MCNEIL, residing at Chicago, in the county of Cook and State of Illinois, and a citizen of the United States, have invented a new and useful Improvement in Automatic Lubricators, of which the following is a full description, reference being had to the accompanying drawings, in which—

Figure 1 is a sectional elevation of the lubricating devices, showing in elevation a portion of the steam-pipe; Fig. 2, a side elevation, with the steam-pipe broken out at the point of connection for the lubricator, and with some portions of the lubricating-cup in section; Figs. 3 and 4, details showing the construction of the head or connection between the steam-pipe and the lubricator; Fig. 5, a detail showing the connection of the controlling rope or cord to the wheel.

What are known or termed "pressure lubricating-cups" have heretofore been constructed and used; but in all the cups of this class heretofore made and used no provision has been made for controlling the feed of the cup, as required for the discharge of the lubricant into the steam-pipe, the feed in all cases being a constant one.

The object of this invention is to construct a pressure-lubricator which can be automatically shut off or opened, as required, to stop the flow of the lubricant or to produce a flow thereof; and its nature consists in combining with a pressure lubricating-cup automatically-operating devices, as hereinafter more specifically described, and pointed out in the claims, by which the feed will be opened on the forward movement of the engine, but will be closed on the reverse movement, at which time or on which movement no lubricant is desired.

The invention is primarily designed for use with engines for operating elevators, but can be used with other class of engine.

In the drawings, A represents the steampipe with which the lubricating device is to be used.

B is a head or connection, having therein a longitudinal passage, $a$, with a mouth, $a'$, opening to the exterior, and a passage, $b$, having a mouth, $b'$, opening to the exterior on the opposite side to the mouth $a'$ in the form of construction shown. The passage $a$ leads at its inner end into a cross-passage, $a''$, and the passage $b$ leads into a cross-passage, $b''$, and this passage $b''$ is controlled by a suitable valve. The connection B, at its outer end, is provided with bosses $B'$ $B''$ $B^3$, which bosses are screw-threaded on their exterior to receive suitable stuffing-boxes to produce a tight connection. The boss $B'$ has therein the cross-passage $b''$, for controlling the passage $b$, which passage extends beyond the passage $b''$ and has communication with the opening in the boss $B^3$.

C is a valve-stem passing through the boss $B'$, and having its inner end formed to close the opening $b$.

$C'$ is the stuffing-box inclosing the stem C, and located on the boss $B'$.

$C''$ is a stuffing-box on the boss $B''$, and encircling a connection, $C^4$, leading out from the boss $B''$.

$C^3$ is a stuffing-box for the boss $B^3$.

D is a stand-pipe, connected at one end to the short connection $C^4$, through which and the passages $a\ a''$ a free communication is had between the steam-pipe A and the stand-pipe D, by which steam can pass to the stand-pipe from the steam-pipe, and after condensation produce in the pipe D the column of water for the pressure; and, as shown, to facilitate condensation, a condenser, $D'$, is applied to the pipe, and the lower end, $D''$, of the pipe is contracted in diameter for pressure purposes.

E is a coupling having three bosses with external screw-threaded ends, one of which receives a stuffing-box, $E'$, encircling a nipple, $E''$, by which the stand-pipe is connected with the coupling, and this boss or end of the coupling has a passage, $c$, which continues through the nipple $E''$, and communicates with the interior of the stand-pipe. This passage leads into a cross-passage, $c'$, and is controlled by a suitable valve or stem, to permit or shut off the flow of water from the stand-pipe.

F is a valve or valve-stem, the body of which is screw-threaded and enters a screw-threaded opening in the boss $E^3$, to have its end seat properly for controlling the passage $c$, and, as shown, a stuffing-box, F', encircles the stem of the screw-threaded end of the boss E³.

G is the oil-cup, attached to the boss E⁴, so that the passage c' leads onto its interior. This cup may be made of sheet-brass or other suitable material, and of a dimension for the size of lubricator required.

H is a plug screw-threaded onto the upper end of the oil-reservoir G. This plug has an interior cavity, $d$, communicating by a hole, $d'$, with a passage, $d''$, which in turn has communication with a discharge-nozzle, $d^3$. On the side of the plug is a nipple, H', having a screw-threaded hole therein, which hole leads into the passage $d''$, and on this nipple is a stuffing-box, H'', and the plug has also a filling-passage, H³, closed by a cap, H⁴, through which lubricant can enter the cup G.

I is a sight-tube, the lower end of which is encircled by a stuffing box or cap, I', screw-threaded onto the plug H around the discharge-nozzle $d^3$, so as to have such nozzle located in the interior of the sight-tube. The upper end of the tube is encircled and held by the stuffing box or cap C³, and this sight-tube forms a communication between the oil-cup and the connection B, by which oil can pass into the passage $b$ to enter the steam-pipe.

The parts so far described constitute one form of pressure-lubricator, and in use the device is connected with a steam-pipe through the connection B, so that steam can enter from the pipe and pass through the passage $a$ to the stand-pipe D, be there condensed, and form water of condensation, which, passing out through the contracted end D'', enters the passage $c\ c'$, and is discharged into the oil-reservoir G, producing pressure on the oil, by which the oil is fed up through the passage $d\ d'\ d''$ into the nozzle $d^3$, to pass therefrom through the sight-tube I into the opening in the end B³ of the connection B, to enter the passage $b$ and pass therefrom through the mouth $b'$ into the steam-pipe A. The flow of the water into the cup from the stand-pipe is controlled by the valve or stem F, and the flow of the oil from the sight-tube through the passage $b$ is controlled by the valve or stem C.

J is a blow-off, usually provided on the lower end of the oil-receptacle G, for the purpose of removing any sediment which may form in the bottom of the cup.

K is a post or standard attached at its lower end to the top of the oil-cup, and forming a support for the connection B, which rests upon its upper end.

L is a valve or valve-stem controlling the passage $d\ d''$ by seating into the opening $d'$, for the purpose of regulating the feed of the oil or stopping the feed entirely, the closing down of the valve or stem shutting off the feed, and the opening thereof allowing a feed of a greater or less quantity, according to the degree of opening.

M is a wheel firmly secured to the outer end of the stem L.

N is a string or cord, one end of which, as shown, is attached to the reversing-lever of the engine, and the other end has attached thereto a weight, N'.

O is a grooved wheel mounted in the outer end of an arm or bracket, O', which arm or bracket, as shown, is attached to the steam-pipe above the connection B.

P is the reversing-lever, of the usual construction and arrangement for levers used in connection with a stationary engine and an elevator, for operating the engine to raise and lower the cage of the elevator. This lever P has thereon a slide, $e$, having an arm, $e'$, on which is a hook, $e''$, by means of which and an eye, $e^3$, on the end of the cord N a connection is made between the cord and the lever. The slide $e$ is free to be moved forward and back on the lever, and when adjusted to any desired position can be locked by a set-screw. The adjustment of the slide farther away from the fulcrum of the lever increases the length of travel given to the cord as the lever is moved. The cord passes up from its connection to the slide over the pulley or grooved wheel O, thence down and around the wheel M, and it is connected to the wheel, so as to prevent slipping, by being passed through an opening, $f$, inward, and thence out through an opening, $f'$, to the exterior of the wheel, as shown in Fig. 5, thus producing a tightening or locking of the wheel to the string or cord. The end of the string or cord, after passing around the wheel, drops down, and has attached to its end, by suitable eyes, $g\ g'$, or otherwise, the weight N', which weight has to be heavy enough to turn the wheel when the portion of the cord between the lever and wheel M becomes slack. The wheel M being rigidly connected to the stem L, and the cord N being firmly connected to this wheel, and being wound thereon in the direction to have a downward pull, operates to turn the wheel in the direction to withdraw the valve or stem from its seat, it will be seen that the downward movement of the lever P required to start the engine in the forward direction pulls down the cord N, turning the wheel M and withdrawing the stem or valve from its seat in the opening $d'$, allowing the oil to pass from the cup into the passage $d$, thence through the opening $d'$ into the passage $d''$, thence into the discharge-nozzle $d^3$, and through the sight-tube into the passage $b$ into the steam-pipe, and this passing of the oil from the cup to the steam-pipe will continue for the period of the forward movement of the engine, during which time the lubricant is required. The reversing of the engine by throwing up the lever slacks the cord between the lever and the wheel M, and as the slack occurs the weight N' will act and turn the wheel, to force the end of the stem or valve L down to its seat in the opening $d'$, shutting off the further supply of oil from the cup, so that there will be no wastage of the lubricant during the reverse movement, as the feed is stopped, and during such reverse movement lubricant is not required and need not be applied.

As shown, the connection is made to the reversing-lever; but in that class of engines where a reversing-shaft is used instead of a reversing-lever the upper pulley can be dispensed with and the cord attached directly to the reversing-shaft, so as to wind upon the shaft on the forward movement and open the stem or valve, and on the reverse movement the operating-cord will unwind, and the weight act and close down the stem or valve.

The amount of feed is regulated by moving the slide on the reversing-lever; and it will be noticed that the feed is wholly independent of the speed, as it is controlled entirely from the lever, so that if the engine is running fast or slow the feed will not be affected thereby, as it depends entirely upon the amount of opening of the valve or stem, which in turn depends upon the radius of attachment to the reversing-lever.

It will be seen from the foregoing that an automatic feed for the lubricant is provided, which occurs only on the forward movement of the engine, where it is required, and is wholly shut off on the reverse movement, where lubricant is not required, thus producing a great saving in the quantity of lubricant used, and having the lubricant supplied only when required.

The controlling mechanism for the feed will not readily get out of order, as when the valve or stem is open for the feed the weight on the rim of the wheel is counterbalanced, so as not to produce a strain, and when the valve is closed down the suspended weight is held by the firm seating of the end of the stem or valve onto its seat in the opening $d'$.

The essential feature of my invention is combining with a pressure-lubricator an automatic feed operating to supply the lubricant on the forward movement of the engine, or when required, and to stop the flow of the lubricant on the reverse movement of the engine, or when not required, or when the engine is at rest, at which time, as well as when reversed, the controlling valve or stem will be seated.

What I claim as new, and desire to secure by Letters Patent, is—

1. The combination, with a pressure oil-cup, of a valve or stem, L, wheel M, and cord N, substantially as and for the purpose specified.

2. The combination, with a pressure oil-cup, of a valve or stem, L, wheel M, cord N, and the means for reversing the engine, substantially as and for the purpose specified.

3. The combination, with a pressure oil-cup, of a valve or stem, L, wheel M, cord N, weight N', and reversing-lever P, substantially as and for the purpose specified.

4. The combination, with an oil pressure-cup, of a valve or stem, L, wheel M, cord N, reversing-lever P, and an adjustable connection between the cord and lever, substantially as and for the purposes specified.

5. The combination, with a steam-pipe, of a pressure oil-cup automatically controlled as to the feed of the lubricant from the cup, substantially in the manner and for the purposes specified.

6. The combination, with a steam-pipe and a pressure lubricating-cup, of automatically-operating devices acting to open and close the passage for the oil from the cup, substantially in the manner and for the purposes specified.

GEORGE McNEIL.

Witnesses:
    ALBERT H. ADAMS,
    HARRY T. JONES.